(12) United States Patent
Matsuyama et al.

(10) Patent No.: US 11,523,005 B2
(45) Date of Patent: Dec. 6, 2022

(54) IMAGE READING APPARATUS AND MULTI-SHEET FEED DETECTION METHOD WITH DETECTION BASED ON RISE OF DRIVING VOLTAGE AND CHANGE AMOUNT OF RECEIVED ULTRASONIC WAVE

(71) Applicant: Seiko Epson Corporation, Tokyo (JP)

(72) Inventors: Koya Matsuyama, Kitakyushu (JP); Daisuke Honda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/558,750

(22) Filed: Dec. 22, 2021

(65) Prior Publication Data

US 2022/0210279 A1      Jun. 30, 2022

(30) Foreign Application Priority Data

Dec. 25, 2020   (JP) ............................. JP2020-217782

(51) Int. Cl.
*H04N 1/00* (2006.01)
*B65H 7/12* (2006.01)

(52) U.S. Cl.
CPC ......... *H04N 1/00082* (2013.01); *B65H 7/125* (2013.01); *H04N 1/00013* (2013.01); *H04N 1/00037* (2013.01); *H04N 1/00076* (2013.01); *H04N 1/00798* (2013.01); *H04N 1/00814* (2013.01); *B65H 2553/30* (2013.01)

(58) Field of Classification Search
None
See application file for complete search history.

(56) References Cited

U.S. PATENT DOCUMENTS

| 7,404,559 | B2* | 7/2008 | Yoshimura | B65H 7/125 271/262 |
| 8,047,541 | B2* | 11/2011 | Segawa | B65H 7/12 271/265.04 |
| 8,657,285 | B2* | 2/2014 | Matsuoka | B65H 5/06 271/262 |
| 8,752,830 | B2* | 6/2014 | Fukusaka | B65H 3/46 271/262 |
| 8,882,373 | B2* | 11/2014 | Inoue | B65H 7/125 400/582 |

(Continued)

FOREIGN PATENT DOCUMENTS

JP       2017-109858       6/2017

*Primary Examiner* — Scott A Rogers
(74) *Attorney, Agent, or Firm* — Workman Nydegger

(57) ABSTRACT

An image reading apparatus includes a control unit configured to detect occurrence or non-occurrence of multi-sheet feed of a medium based on a reception level signal output by a reception unit in accordance with the received ultrasonic wave. The control unit, after a tip of the medium reaches the positions of the reception unit in a transport path, when the reception level signal is below a predetermined threshold, causes the driving voltage to rise, when an amount of change in the reception level signal in accordance with the rise in the driving voltage is smaller than a reference amount of change, determines that multi-sheet feed is ongoing, and when the amount of change in the reception level signal in accordance with the rise in the driving voltage is greater than the reference amount of change, determines that multi-sheet feed is not ongoing.

8 Claims, 10 Drawing Sheets

(56) References Cited

U.S. PATENT DOCUMENTS

| | | | |
|---|---|---|---|
| 9,656,820 B2* | 5/2017 | Yoshimura | B65H 7/18 |
| 9,733,218 B2* | 8/2017 | Ono | G01N 29/4427 |
| 10,574,847 B2* | 2/2020 | Honda | H04N 1/00777 |
| 10,894,680 B2* | 1/2021 | Nishizaka | B65H 3/0669 |
| 2001/0042956 A1* | 11/2001 | Minoru | B65H 7/125 |
| | | | 271/265.04 |
| 2022/0033209 A1* | 2/2022 | Fukumitsu | B65H 3/0669 |
| 2022/0073302 A1* | 3/2022 | Shimosaka | B65H 7/125 |

* cited by examiner

IMAGE READING APPARATUS AND MULTI-SHEET FEED DETECTION METHOD WITH DETECTION BASED ON RISE OF DRIVING VOLTAGE AND CHANGE AMOUNT OF RECEIVED ULTRASONIC WAVE

The present application is based on, and claims priority from JP Application Serial Number 2020-217782, filed Dec. 25, 2020, the disclosure of which is hereby incorporated by reference herein in its entirety.

BACKGROUND

1. Technical Field

The present disclosure relates to an image reading apparatus and a multi-sheet feed detection method.

2. Related Art

Among image reading apparatuses such as scanners, there exist those that have an ultrasonic wave sensor installed therein for multi-sheet feed detection of media that serve as original documents. As a related technique, a multi-sheet feed detection apparatus is known that detects occurrence of multi-sheet feed of paper based on a transmitter that outputs an ultrasonic wave, a receiver that outputs a signal in accordance with the received ultrasound wave, a signal output by the receiver, and a threshold (see JP-A-2017-109858).

Transporting a medium in a single sheet state is referred to as single sheet feed, while transporting a medium in a state in which a plurality of sheets are overlapped one on another is referred to as multi-sheet feed.

The thicker the medium that passes through between the transmitter and the receiver that constitute an ultrasound wave sensor, the lower the level of the signal output by the receiver. The threshold for multi-sheet feed detection is set to a value below the level attained when single sheet feed of thick paper is carried out under the general use environment in which the image reading apparatus is placed. However, due to reasons such as high altitude of the use environment, aged deterioration of the ultrasonic wave sensor, position shift between the transmitter and the receiver, and effect of temperature and other various factors, the level of the signal output by the receiver sometimes falls below the threshold even though single sheet feed is actually ongoing, resulting in the determination that multi-sheet feed is ongoing. There is a demand for avoiding such erroneous determination and enhancing accuracy of multi-sheet feed detection.

SUMMARY

An image reading apparatus includes: a transport unit configured to transport a medium, a transmission unit and a reception unit disposed at positions sandwiching a transport path of the medium transported by the transport unit, the transmission unit being configured to emit an ultrasonic wave in accordance with a driving voltage and the reception unit being configured to receive the ultrasonic wave, a reading unit configured to read the medium transported by the transport unit, and a control unit configured to detect occurrence or non-occurrence of multi-sheet feed of the medium based on a reception level signal output by the reception unit in accordance with the received ultrasonic wave, the control unit, after a tip of the medium has reached the positions of the transmission unit and the reception unit in the transport path, when the reception level signal is below a predetermined threshold, causing the driving voltage to rise from a first voltage to a second voltage, when an amount of change in the reception level signal in accordance with the rise in the driving voltage is smaller than a reference amount of change, determining that multi-sheet feed is ongoing, and when the amount of change in the reception level signal in accordance with the rise in the driving voltage is greater than the reference amount of change, determining that multi-sheet feed is not ongoing.

A multi-sheet feed detection method for detecting, using a transmission unit and a reception unit disposed at positions sandwiching a transport path through which a medium is transported, the transmission unit being configured to emit an ultrasonic wave in accordance with a driving voltage and the reception unit being configured to receive the ultrasonic wave, occurrence or non-occurrence of multi-sheet feed of the medium based on a reception signal level output by the reception unit in accordance with the received ultrasonic wave includes, after a tip of the medium has reached the positions of the transmission unit and the reception unit in the transport path, when the reception level signal is below a predetermined threshold, causing the driving voltage to rise from a first voltage to a second voltage, when an amount of change in the reception level signal in accordance with the rise in the driving voltage is smaller than a reference amount of change, determining that multi-sheet feed is ongoing, and when the amount of change in the reception level signal in accordance with the rise in the driving voltage is greater than the reference amount of change, determining that multi-sheet feed is not ongoing.

DESCRIPTION OF EXEMPLARY EMBODIMENTS

Hereinafter, embodiments of the present disclosure will be described with reference to the accompanying drawings. Note that each of the drawings is merely illustrative for describing the present disclosure. Since the drawings are illustrative, proportions and shapes may not be precise; the drawings may not match each other; and some portions may be omitted.

1. Apparatus Configuration

Figure 1:
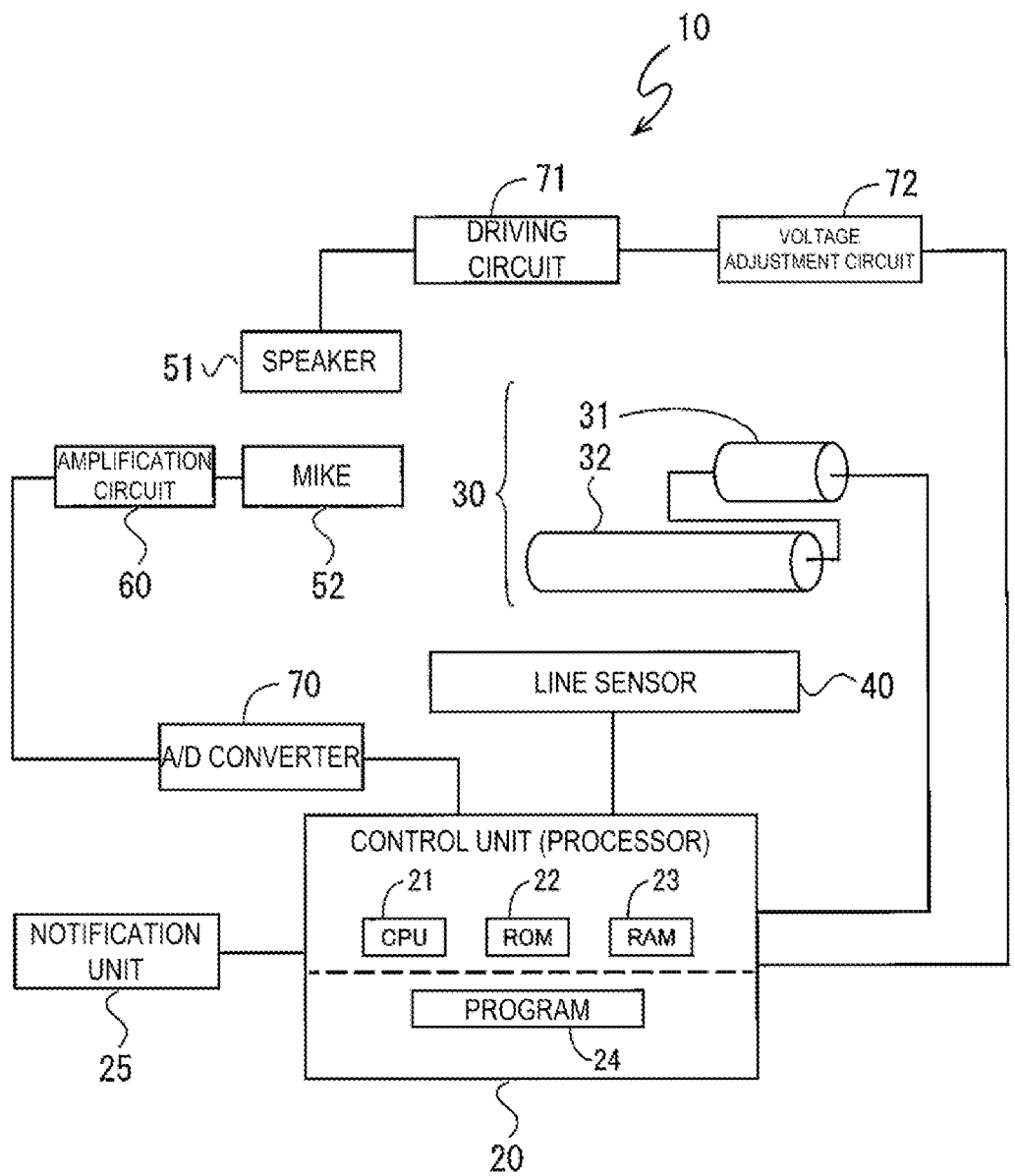
FIG. 1 is a block diagram illustrating an apparatus configuration in a simplified manner.

FIG. 1 illustrates a configuration of an image reading apparatus 10 according to the present embodiment in a simplified manner by a block diagram. The image reading apparatus 10 is an apparatus capable of reading a medium that serves as an original document, and may be a scanner, a facsimile, a multifunction machine, and the like. The image reading apparatus 10 includes a control unit 20 that corresponds to a processor. The control unit 20 includes an integrated circuit (IC) that has a central processing unit (CPU) 21, a read-only memory (ROM) 22, and a random access memory (RAM) 23, as well as other components such as a non-volatile memory.

In the control unit 20, the CPU 21 executes arithmetic processing according to a program 24 stored in the ROM 22 or other components such as a memory by using the RAM 23 as a work area, and thereby controls the image reading apparatus 10. At least a portion of the program 24 corresponds to a multi-sheet feed detection program. The image reading apparatus 10 executes a multi-sheet feed detection method. The processor is not limited to a single CPU. Processing may be performed by a plurality of CPUs or a hardware circuit such an application-specific integrated circuit (ASIC), and a CPU and a hardware circuit may work in concert to perform processing.

The image reading apparatus 10 includes a transport unit 30 configured to transport a medium, and a reading unit 40 configured to read the transported medium. The reading unit 40 is, for example, a line sensor in which a plurality of photoelectric conversion elements are one-dimensionally arranged. The transport unit 30 includes one or a plurality of motors 31, one or a plurality of rollers 32 configured to rotate by the power of the motor 31, and a transport path configured to cause the medium transported by the roller 32 to pass therethrough. For the transport path, see the reference sign 33 in FIG. 2. It can also be said that the roller 32 constitutes a portion of the transport path. When the motor 31 is driven in accordance with a control signal from the control unit 20, the roller 32 rotates, and the transport unit 30 transports the medium from upstream to downstream of the transport path. Hereinafter, upstream and downstream in the transport path may also be simply referred to as upstream and downstream. The image reading apparatus 10 including such a transport unit 30 can also be considered as a kind of medium transport apparatus.

When the control unit 20 controls the transport unit 30 to cause the medium to be transported along the transport path, the reading unit 40 that serves as a line sensor and that is disposed such that the longitudinal direction thereof intersects with the transport path outputs a reading signal corresponding to the contrast or color of the medium being transported to the control unit 20. The control unit 20 generates image data based on the reading signal of the medium by the reading unit 40, and outputs the image data or output data obtained by converting the image data into a different format to an external computer (not illustrated) and the like.

At positions sandwiching the transport path, a speaker 51 and a microphone 52 are disposed so as to face each other. Microphone is abbreviated as mike. The speaker 51 and the mike 52 are disposed at positions upstream of the reading unit 40 in the transport path. The speaker 51 and the mike 52 are collectively referred to as an ultrasonic wave sensor. When a driving signal is inputted, the speaker 51 outputs an ultrasonic wave toward the mike 52. The speaker 51 corresponds to a transmission unit that emits ultrasound waves. The mike 52 outputs a signal corresponding to the volume of the received ultrasound wave. The mike 52 corresponds to a reception unit that receives ultrasound waves. In a situation where there is a medium between the speaker 51 and the mike 52, ultrasonic waves will be attenuated. When there are a plurality of sheets of the medium in an overlapped state between the speaker 51 and the mike 52, ultrasound waves will be attenuated to a greater extent. The signal output by the mike 52 is also referred to as the reception level signal.

An output terminal of the mike 52 is coupled to an input terminal of an amplification circuit 60, and an output terminal of the amplification circuit 60 is coupled to an input terminal of an A/D converter 70. An output terminal of the A/D converter 70 is coupled to one of the input terminals of the control unit 20. When the A/D converter 70 is understood as a part of the control unit 20, then the output terminal of the amplification circuit 60 is coupled to the control unit 20. The signal received and output by the mike 52 is inputted to the amplification circuit 60. The amplification circuit 60 amplifies the inputted signal and outputs the amplified signal. The amplification circuit 60 includes one or more amplifiers having a predetermined amplification factor, a band-pass filter, a peak hold circuit, and the like.

The signal amplified by the amplification circuit 60 is converted from analog to digital by the A/D converter 70 before being inputted to the control unit 20. For the control unit 20, the digital signal inputted from the A/D converter 70 is the reception level signal. The control unit 20 detects occurrence or non-occurrence of multi-sheet feed of the medium based on the reception level signal inputted in a time period in which the medium transported by the transport unit 30 passes through between the speaker 51 and the mike 52 in the transport path.

A driving circuit 71 outputs a driving signal to the speaker 51. The driving circuit 71 is an oscillating circuit that outputs an alternating signal of an ultrasonic wave frequency so as to cause the speaker 51 to output ultrasonic waves. A voltage regulation circuit 72 is controlled by the control unit 20 to supply a driving voltage to the driving circuit 71. The magnitude of the driving signal output by the driving circuit 71 is generally proportional to the driving voltage by the voltage regulation circuit 72. The volume of ultrasonic waves emitted by the speaker 51 is also generally proportional to this driving voltage. The output of the mike 52 is also proportional to the volume of ultrasonic waves emitted by the speaker 51. Accordingly, the control unit 20 can regulate the driving voltage supplied by the voltage regulation circuit 72, and thereby regulate the output of the mike 52. The voltage regulation circuit 72 is capable of setting and outputting any one of a plurality of different driving voltages in accordance with an instruction from the control unit 20.

Hereinafter, the driving voltage supplied by the voltage regulation circuit 72 is simply referred to as the driving voltage.

Figure 2:
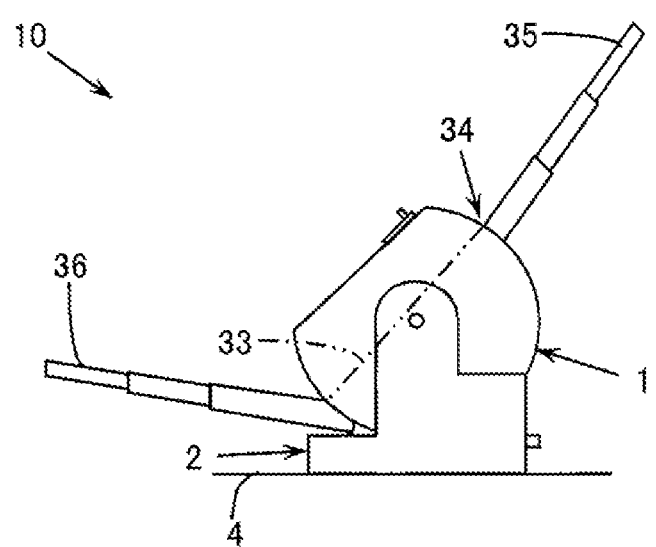
FIG. 2 is a diagram illustrating an external appearance of an image reading apparatus.

FIG. 2 simply illustrates an external appearance of the image reading apparatus 10 from a sideways perspective of the image reading apparatus 10. The image reading apparatus 10 includes a main body 1 and a support portion 2 of the main body 1. Although omitted in FIG. 2, the main body 1 includes the configuration illustrated in FIG. 1. The support portion 2 supports the main body 1 with the image reading apparatus 10 placed on a placement surface 4. In FIG. 2, a transport path 33 inside the main body 1 is indicated by a two-dot-dash line. Upstream of the transport path 33 is a paper feed port 34. A paper feed tray 35 extends upstream of the paper feed port 34. That is, the medium placed at the paper feed tray 35 is fed from the paper feed port 34 into the main body 1 by the transport unit 30 and transported along the transport path 33. The paper feed tray 35 is also referred to as the original document tray. A paper discharge tray 36 is provided downstream of the transport path 33. The transport unit 30 transports further downstream the medium read by the reading unit 40 in the middle of the transport path 33, and thereby discharges the read medium to the paper discharge tray 36.

As illustrated in FIG. 1, the image reading apparatus 10 includes a notification unit 25. The notification unit 25 is a unit for notifying to the outside. Specifically, a display unit for displaying characters and images, and a speaker for emitting sound directed to a user correspond to the notification unit 25. The speaker that serves as the notification unit 25 is separate from the speaker 51 that emits ultrasonic waves.

2. Multi-Sheet Feed Detection Processing

Multi-sheet feed detection processing executed by the control unit 20 according to the program 24 will be described.

Figure 3:
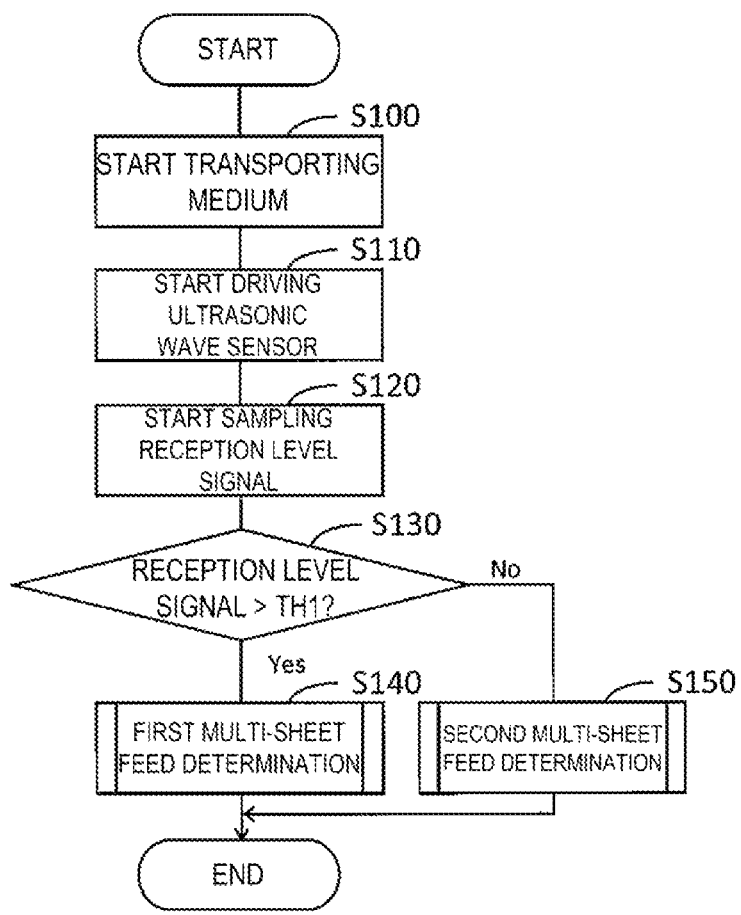
FIG. 3 is a flowchart illustrating multi-sheet feed detection processing.
Figure 4:
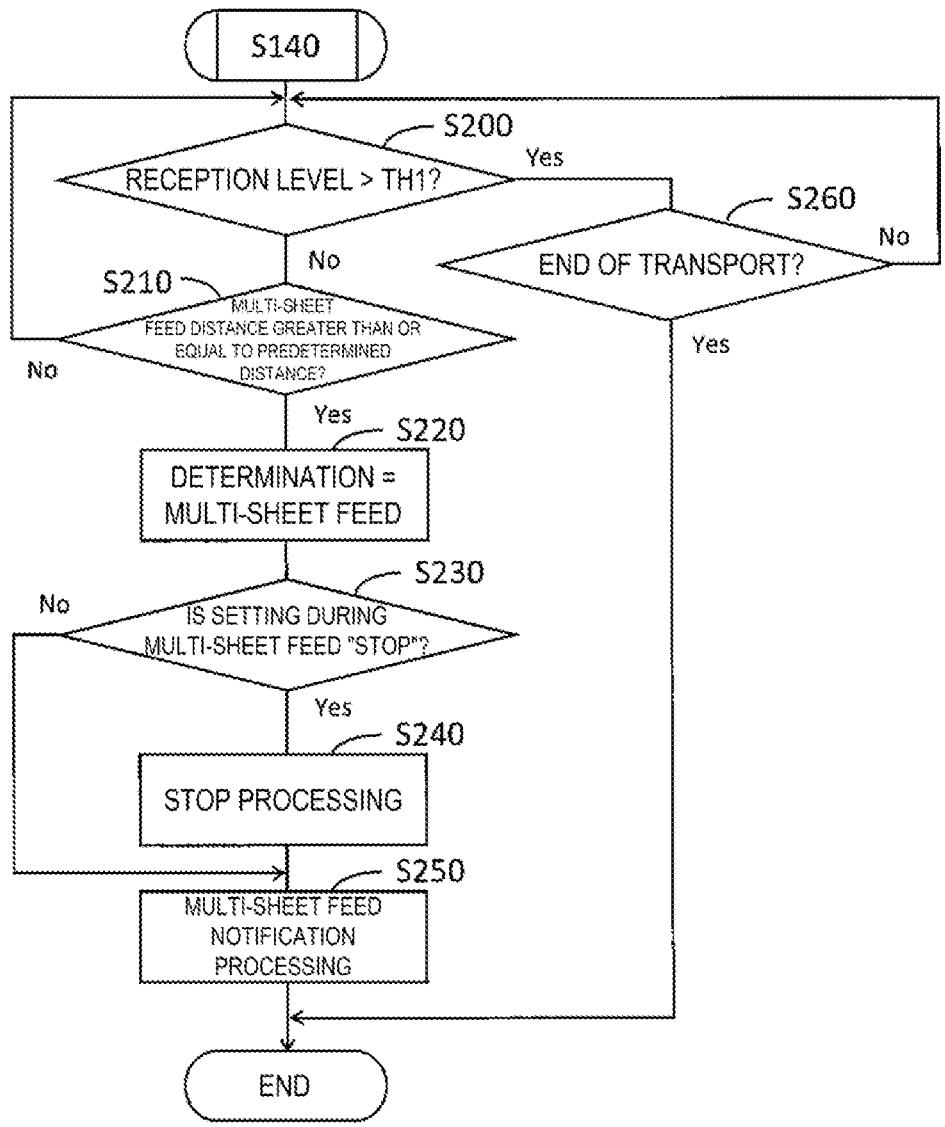
FIG. 4 is a flowchart illustrating details of step S140.
Figure 5:
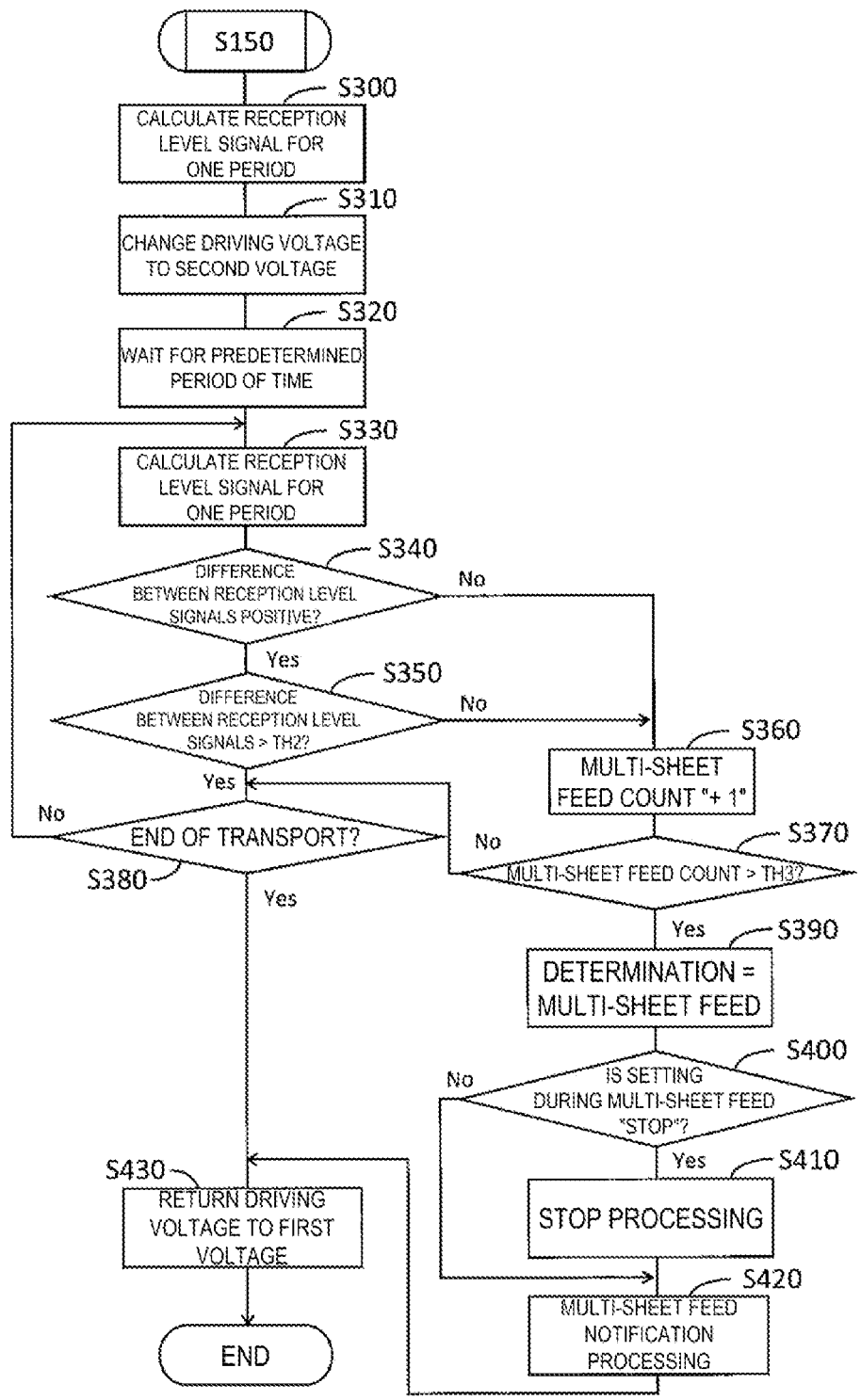
FIG. 5 is a flowchart illustrating details of step S150.

FIGS. 3, 4, and 5 illustrate multi-sheet feed detection processing by flowcharts. At least a portion of such multi-sheet feed detection processing corresponds to a multi-sheet feed detection method.

In step S100 in FIG. 3, the control unit 20 starts driving the transport unit 30, and causes the transport unit 30 to start transporting the medium from the paper feed tray 35.

In step S110, the control unit 20 starts the supply of the driving voltage to the driving circuit 71 by the voltage regulation circuit 72, and thereby starts driving the ultrasonic wave sensor. In step S110, the control unit 20 causes the voltage regulation circuit 72 to start the supply of a predetermined first voltage as the driving voltage.

Following step S110, in step S120, the control unit 20 starts sampling the reception level signal inputted from the A/D converter 70 at a constant time interval.

After the tip of the medium transported by the transport unit 30 has reached the positions of the speaker 51 and the mike 52 in the transport path 33, that is, the position of the ultrasonic wave sensor, the control unit 20 executes step S130. The tip of the medium is an end facing downstream of the medium. An end facing upstream of the medium is referred to as the trailing end of the medium. When there is a medium between the speaker 51 and the mike 52, the value of the reception level signal significantly drops compared to when there is no medium therebetween. Accordingly, the control unit 20 can determine, based on the magnitude of the reception level signal, whether the tip of the medium has reached the position of the ultrasonic wave sensor in the transport path 33.

In step S130, the control unit 20 compares the reception level signal with a predetermined threshold for multi-sheet feed detection (hereinafter, the first threshold TH1).

Basically, the control unit 20 can determine that proper feed, that is, single sheet feed is ongoing when the reception level signal exceeds the first threshold TH1; and the control unit 20 can determine that improper feed, that is, multi-sheet feed is ongoing when the reception level signal is below the first threshold TH1. However, in the present embodiment, in addition to such a simple comparison, a second multi-sheet feed determination as described particularly in FIG. 5 is performed to improve detection accuracy for the occurrence or non-occurrence of multi-sheet feed. In step S130, when the reception level signal exceeds the first threshold TH1, the control unit 20 makes a "Yes" determination and the processing proceeds to a first multi-sheet feed determination in step S140; and when the reception level signal is below the first threshold TH1, the control unit 20 makes a "No" determination and the processing proceeds to the second multi-sheet feed determination in step S150. When the threshold and the comparison target are equal, either handling is fine as far as the design of the program 24 is concerned. In the example of FIG. 3, when the reception level signal≤the first threshold TH1, the processing proceeds from step S130 to step S150.

FIG. 4 illustrates details of step S140 by a flowchart.

In step S200, similar to step S130, the control unit 20 compares the reception level signal with the first threshold TH1. In step S200, when the reception level signal exceeds the first threshold TH1, the control unit 20 makes a "Yes" determination and the processing proceeds to step S260; and when the reception level signal is below or equal to the first threshold TH1, the control unit 20 makes a "No" determination and the processing proceeds to step S210.

In step S260, the control unit 20 determines whether the transport of the medium has ended. In a case in which the transport of the medium has ended, the control unit 20 makes a "Yes" determination to terminate the flowcharts in FIGS. 3 and 4. On the other hand, in a case in which the transport of the medium has not ended, the control unit 20 makes a "No" determination and the processing returns to step S200. As opposed to when the tip of the medium has reached the position of the ultrasonic wave sensor in the transport path 33, the value of the reception level signal significantly rises when the trailing end of the medium passes through the position of the ultrasonic wave sensor. Accordingly, the control unit 20 has only to make a "Yes" determination in step S260 when it can be determined, based on the magnitude of the reception level signal, that the trailing end of the medium passes through the position of the ultrasonic wave sensor.

End of transport in step S260 and in step S380 to be described later only means that transport in the context of multi-sheet feed detection processing has ended. Even after making a "Yes" determination in steps S260 and S380, the control unit 20 continues the transport by the transport unit 30 until the medium being transported is discharged to the paper discharge tray 36. It goes without saying that the medium is read by the reading unit 40 in the process until discharged. The "Yes" determination in step S260 means that the control unit 20 has not determined that multi-sheet feed is ongoing for the medium being transported by the transport unit 30. This is equivalent to having made a determination that non-multi-sheet feed, that is, single sheet feed is ongoing.

On the other hand, in step S210, the control unit 20 determines whether the multi-sheet feed distance is greater than or equal to a predetermined distance. The distance herein is the distance along the transport path 33. The predetermined distance is, for example, a few centimeters. When the multi-sheet feed distance is below the predetermined distance, the control unit 20 makes a "No" determination and the processing returns to step S200; and when the multi-sheet feed distance is greater than or equal to the predetermined distance, the control unit 20 makes a "Yes" determination and the processing proceeds to step S220. The multi-sheet feed distance is the transport distance of the medium transported by the transport unit 30 during a time period in which "No" determinations continue to be made in step S200. The transport speed of the medium transported by the transport unit 30 is known to the control unit 20.

In step S220, the control unit 20 determines that multi-sheet feed is ongoing for the medium being transported. That is, multi-sheet feed is detected when a multi-sheet feed distance greater than or equal to a certain length has occurred. According to the flow of steps S200, S210, and S220, it is possible to determine that multi-sheet feed is ongoing not only for typical multi-sheet feed in which two sheets of the medium are overlapped one on the other with a slight misalignment in the transport direction, but also for a situation where a label of a certain size is attached to a portion of one sheet of the medium.

In step S230, the control unit 20 determines whether the processing to be performed when it is determined that multi-sheet feed is ongoing is set to "stop". The user can set in advance the processing to be performed when the control unit 20 determines that multi-sheet feed is ongoing. In a case in which the processing to be performed when it is determined that multi-sheet feed is ongoing is set to "stop", the control unit 20 makes a "Yes" determination and the processing proceeds to step S240; in the absence of this "stop" setting, the control unit 20 makes a "No" determination and the processing proceeds to step S250.

In step S240, the control unit 20 performs stop processing. In the stop processing, transport of the medium by the transport unit 30 is stopped. Moreover, in the stop processing, the control unit 20 also stops reading of the medium by the reading unit 40. After step S240, the processing proceeds to step S250.

When a "No" determination was made in step S230 to skip step S240, although it was determined that multi-sheet feed is ongoing, the control unit 20 causes the transport unit 30 to continue transporting and the reading unit 40 to continue reading.

In step S250, the control unit 20 performs notification processing to perform notification, to the outside, of occurrence of multi-sheet feed, and thereafter terminates the flowcharts in FIGS. 3 and 4. In step S250, the control unit 20 controls the notification unit 25 so as to cause the notification unit 25 to notify to the user that multi-sheet feed has occurred by the display of a text or an illustration, or an alarm or voice message, for example.

The determination in step S230 may be omitted. That is, step S240 may be always executed after step S220.

FIG. 5 illustrates details of step S150 by a flowchart.

In step S300, the control unit 20 calculates the reception level signal for one period. One period herein is a unit for calculating the reception level signal once in the second multi-sheet feed determination in step S150, and has a predetermined length. As described above, in step S120 and onward, the control unit 20 samples the reception level signal inputted from the A/D converter 70 at a constant time interval. One period corresponds to a time period in which the reception level signal can be sampled N times. N is an integer greater than or equal to 2. Accordingly, the control unit 20 has only to use the average value of the reception level signal that has been sampled N times during one period as the reception level signal for the one period.

In step S310, the control unit 20 changes the driving voltage supplied by the voltage regulation circuit 72 to the driving circuit 71 from the current first voltage to a predetermined second voltage. First voltage<second voltage.

After step S310, the control unit 20 waits for a predetermined period of time (step S320) before calculating, in step S330, the reception level signal for one period. The processing of step S330 is the same as that of step S300. However, in step S330, since the driving voltage is different from that of step S300, the calculated reception level signal is also different from the value calculated in step S300.

As the driving voltage rises from the first voltage to the second voltage, the reception level signal changes. After causing the driving voltage to rise to the second voltage in step S310, to calculate the reception level signal for one period after the reception level signal has stabilized to a certain degree, the control unit 20 waits for a predetermined period of time before execution of step S330.

In step S340, the control unit 20 determines whether a difference (hereinafter, the difference) obtained by subtracting the reception level signal obtained when the driving voltage is at the first voltage from the reception level signal calculated in step S330 is a positive value. The reception level signal obtained when the driving voltage is at the first voltage is the reception level signal calculated in step S300. The difference is an "amount of change in the reception level signal in accordance with a rise in the driving voltage". When the difference is a positive value, the control unit 20 makes a "Yes" determination and the processing proceeds to step S350; on the other hand, when the difference is a negative value, the control unit 20 makes a "No" determination and the processing proceeds to step S360.

In step S350, the control unit 20 determines whether the difference is greater than a predetermined threshold for the difference (hereinafter, the second threshold TH2). The second threshold TH2 corresponds to a "reference amount of change". At the timing when the image reading apparatus 10 is powered on, which is prior to starting multi-sheet feed detection processing, the control unit 20 has already determined the second threshold TH2. A method for determining the second threshold TH2 will be described later. When the difference is greater than the second threshold TH2, the control unit 20 makes a "Yes" determination and the processing proceeds to step S380; and when the difference is smaller than the second threshold TH2, the control unit 20 makes a "No" determination and the processing proceeds to step S360. In the example of FIG. 5, when the difference≤the second threshold TH2, the processing proceeds from step S350 to step S360.

In step S360, the control unit 20 increments the value of a multi-sheet feed count by +1. The multi-sheet feed count indicates that the greater the value, the more likely that multi-sheet feed is ongoing. At the start of step S150, the control unit 20 resets the value of the multi-sheet feed count to 0.

After step S360, in step S370, the control unit 20 determines whether the value of the multi-sheet feed count is greater than a predetermined threshold for the multi-sheet feed count (hereinafter, the third threshold TH3). The third threshold TH3 is an integer greater than or equal to 1. When the value of the multi-sheet feed count is greater than the third threshold TH3, the control unit 20 makes a "Yes" determination and the processing proceeds to step S390; in step S390, the control unit 20 determines that multi-sheet feed is ongoing for the medium being transported.

On the other hand, when the value of the multi-sheet feed count does not exceed the third threshold TH3, the control unit 20 makes a "No" determination in step S370 and the processing proceeds to step S380.

In step S380, the control unit 20 determines whether the transport of the medium has ended; in a case in which the transport of the medium has ended, the control unit 20 makes a "Yes" determination and the processing proceeds to step S430. On the other hand, in a case in which the transport of the medium has not ended, the control unit 20 makes a "No" determination in step S380 and the processing returns to step S330.

In step S380, similar to step S260 in FIG. 4, the control unit 20 has only to make a "Yes" determination when it can be determined that the trailing end of the medium passes through the position of the ultrasonic wave sensor. The "Yes" determination in step S380 means, similar to the "Yes" determination in step S260, that the control unit 20 has not determined that multi-sheet feed is ongoing for the medium being transported. This is equivalent to having made a determination that non-multi-sheet feed, that is, single sheet feed is ongoing.

Figure 6:
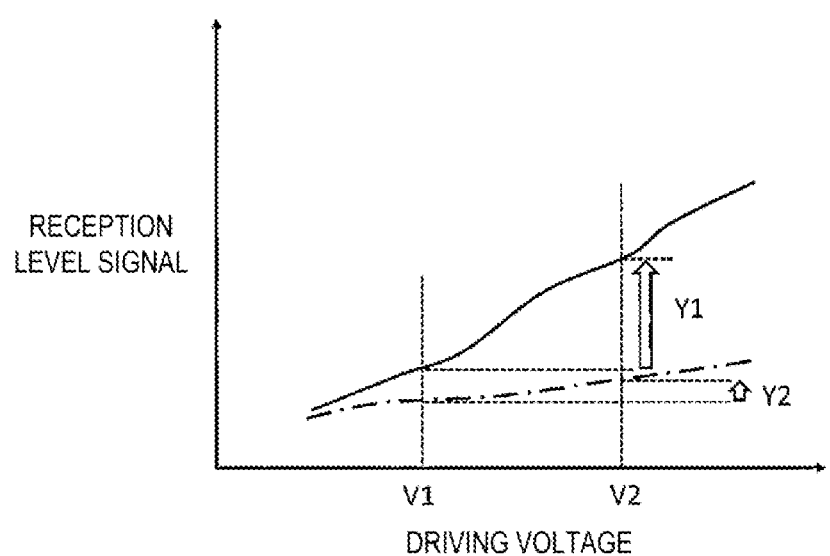
FIG. 6 is a diagram showing change in a reception level signal in accordance with a driving voltage in a graph.

FIG. 6 shows, for each of single sheet feed and multi-sheet feed, how the reception level signal changes in accordance with the driving voltage in a graph. In FIG. 6, the horizontal axis is the driving voltage while the vertical axis is the reception level signal. In FIG. 6, the solid line graph shows the reception level signal obtained when single sheet feed of certain thick paper is carried out; the one-dot-dash line graph shows the reception level signal obtained when multi-sheet feed of certain thin paper is carried out. Thin paper and thick paper are relative expressions and do not necessarily refer to specific paper. However, for example, paper having a basis weight of approximately 25 g corresponds to thin paper. In addition, for example, paper having a basis weight exceeding 100 g or 200 g corresponds to thick paper. Basis weight is the weight per square meter, and it may be understood that the heavier the basis weight, the larger the thickness of the medium.

The driving voltage V1 is the first voltage and the driving voltage V2 is the second voltage. It is assumed that in the two graphs in FIG. 6, the reception level signal corresponding to the driving voltage V1 is smaller than the first threshold TH1 in both cases. That is, due to altitude and other various factors described above, it is possible that, similar to the reception level signal obtained during multi-sheet feed, the reception level signal obtained during single sheet feed falls below the first threshold TH1, and a "No" determination is made in step S130 in FIG. 3.

However, the amount of change in the reception level signal in accordance with a rise in the driving voltage varies between single sheet feed and multi-sheet feed. When multi-sheet feed is ongoing, there is an air layer between a medium and another medium. The air layer between the media significantly attenuates the ultrasonic wave signal received by the mike 52. Accordingly, as shown by the one-dot-dash line graph in FIG. 6, during multi-sheet feed, the amount of change in the reception level signal in accordance with a rise in the driving voltage is small; and the amount of change in the reception level signal in accordance with the rise from the driving voltage V1 to the driving voltage V2 is only Y2. On the other hand, during single sheet feed, there is no attenuation effect by the air layer described above, so the amount of change in the reception level signal in accordance with a rise in the driving voltage is large, as shown by the solid line graph in FIG. 6; and the amount of change in the reception level signal in accordance with the rise from the driving voltage V1 to the driving voltage V2 is Y2, which is larger than Y1. For these reasons, in the present embodiment, when a "No" determination is made in step S130, step S150 is executed; when the difference is smaller than the second threshold TH2, it is determined that multi-sheet feed is ongoing; and when the difference is greater than the second threshold TH2, it is determined that multi-sheet feed is not ongoing.

In step S430, the control unit 20 returns the driving voltage supplied by the voltage regulation circuit 72 to the driving circuit 71 from the second voltage to the first voltage, and thereafter terminates the flowcharts in FIGS. 3 and 5. For steps S400, S410, and S420 that come after step S390, the description for steps S230, S240, and S250 that come after step S220 similarly applies. Following step S420, the control unit 20 proceeds to step S430, and thereafter terminates the flowcharts in FIGS. 3 and 5.

Figure 7A:
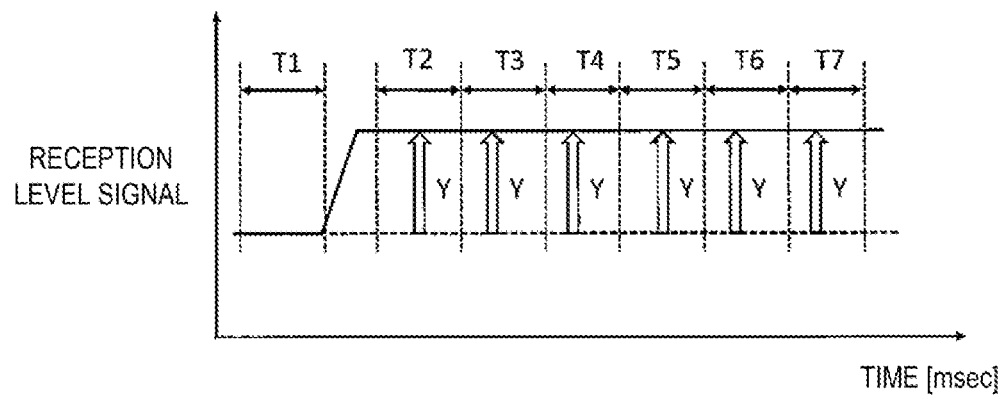
FIG. 7A is a diagram showing change in a reception level signal as a function of time progression assuming single sheet feed of thick paper.
Figure 7B:
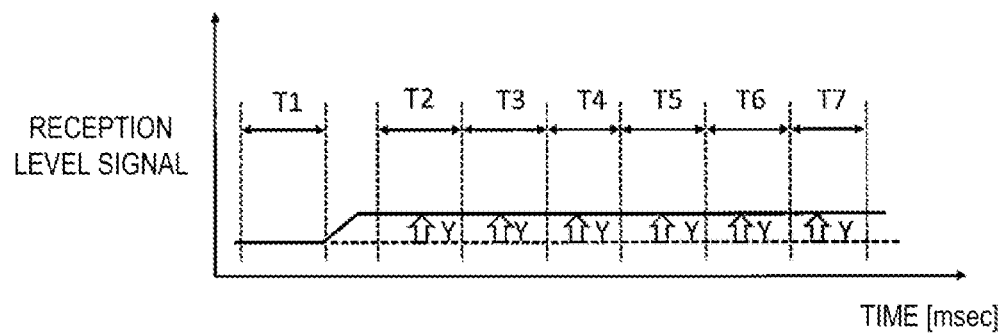
FIG. 7B is a diagram showing change in a reception level signal as a function of time progression assuming multi-sheet feed of thin paper.
Figure 7C:
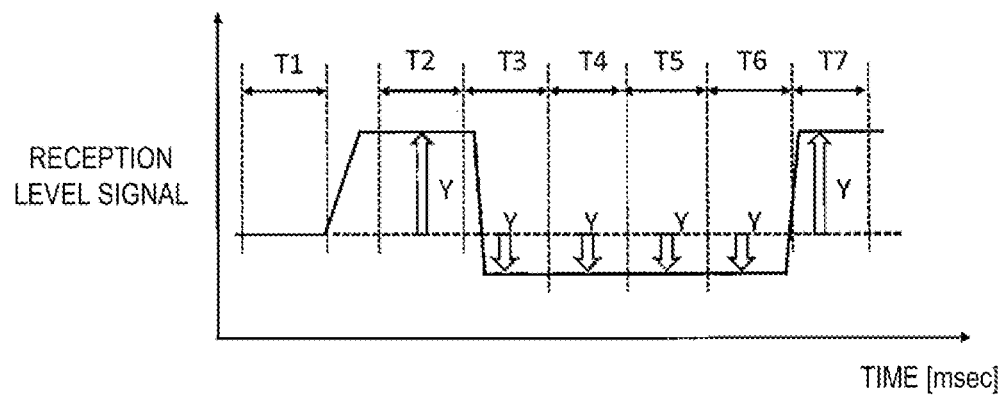
FIG. 7C is a diagram showing change in a reception level signal as a function of time progression assuming single sheet feed of thick paper with a label being attached thereto.

The second multi-sheet feed determination in step S150 will be specifically described with reference to FIGS. 7A, 7B, and 7C. Each of FIGS. 7A, 7B, and 7C shows change in the reception level signal as a function of time progression. In FIGS. 7A, 7B, and 7C, the time period T1 is one period of interest of which the reception level signal is calculated in step S300. Each of the time periods T2, T3, T4, T5, T6, T7, . . . , after the time period T1 is one period of interest of which the reception level signal is calculated in step S330. As can be understood from the description above, in the time period T1, the driving voltage is at the first voltage.

In FIGS. 7A, 7B, and 7C, it is assumed that the reception level signal for the time period T1 is below the first threshold TH1. The period of time from the end of the time period T1 until the start of the time period T2 corresponds to steps S310 and S320. That is, after the time period T1, the driving voltage rises from the first voltage to the second voltage, and the reception level signal also changes in accordance with this rise. Furthermore, when the reception level signal is stabilized after this change, the time period T2 begins.

In FIGS. 7A, 7B, and 7C, the Y placed so as to correspond to the time period T2 is a "difference" obtained by subtracting the reception level signal for the time period T1 calculated in step S300 from the reception level signal for the time period T2 calculated in step S330. Similarly, the Y placed so as to correspond to the time period T3 is a "difference" obtained by subtracting the reception level signal for the time period T1 calculated in step S300 from the reception level signal for the time period T3 calculated in step S330. Such difference Y for each time period T2, T3, T4, T5, T6, T7, . . . , is compared with the second threshold TH2 at step S350.

FIG. 7A is a diagram that assumes a situation where single sheet feed of thick paper is carried out. That is, when single sheet feed of thick paper is carried out, due to factors such as altitude, the reception level signal obtained when the driving voltage is at the first voltage can fall below the first threshold TH1; however, each difference Y for each time period T2, T3, T4, T5, T6, T7, . . . , obtained after the driving voltage is raised to the second voltage is relatively large. Therefore, since each difference Y is above the second threshold TH2, a "Yes" determination is made each time in step S350, and a correct determination result that multi-sheet feed is ongoing is obtained.

On the other hand, FIG. 7B is a diagram that assumes a situation where multi-sheet feed of thin paper is carried out. During multi-sheet feed of thin paper, the reception level signal obtained when the driving voltage is at the first voltage is below the first threshold TH1. Thereafter, even when the driving voltage is raised to the second voltage, each difference Y obtained for each time period T2, T3, T4, T5, T6, T7, . . . , is relatively small. Therefore, since each difference Y is below the second threshold TH2, a "No" determination is made each time in step S350, the multi-sheet feed count exceeds the third threshold TH3, and a correct determination result that multi-sheet feed is ongoing is obtained.

FIG. 7C is a diagram that assumes a situation where single sheet feed of thick paper is carried out with a label attached thereto at an upstream position separated from the tip to a certain degree. Similar to the description of FIG. 7A, during single sheet feed of thick paper, the reception level signal obtained when the driving voltage is at the first voltage can fall below the first threshold TH1; however, the difference Y obtained in the time period T2 after the driving voltage is raised to the second voltage is relatively large. However, in the example of FIG. 7C, partial multi-sheet feed occurs due to the effect of the label. In the time periods T3, T4, T5, and T6, in which the label passes through the ultrasonic wave sensor along with the medium, the reception level signal drops below the reception level signal for the time period T1, with each difference Y for each of the time periods T3, T4, T5, and T6 taking a negative value. Therefore, for each difference Y for each of the time periods T3, T4, T5, and T6, a "No" determination is made each time in step S340, and when the multi-sheet feed count exceeds the third threshold TH3, a determination result that multi-sheet feed is ongoing is obtained. That is, partial multi-sheet feed caused by a label can also be detected as a kind of multi-sheet feed.

3. Method of Determining the Reference Amount of Change

A method of determining a reference amount of change, i.e., the second threshold TH2, will be described with reference to FIG. 8.

Figure 8:
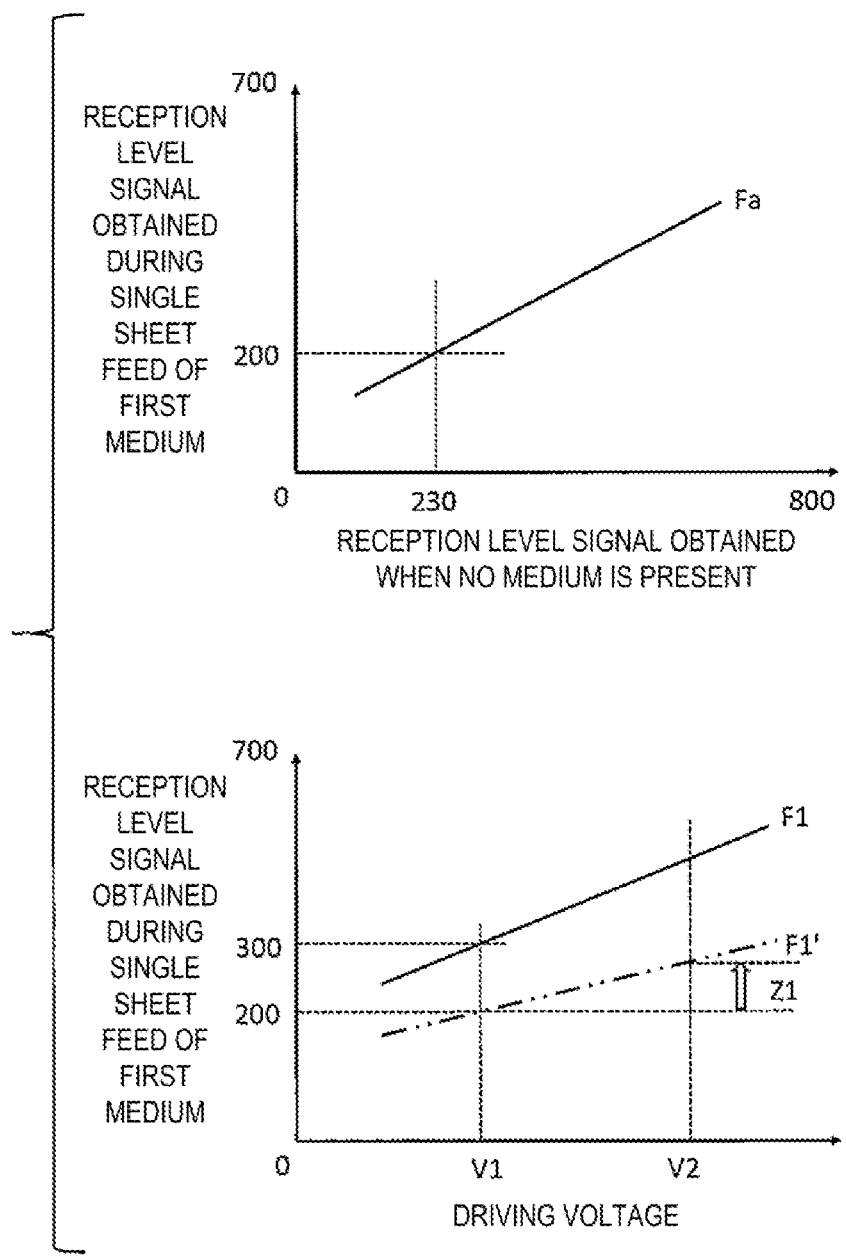
FIG. 8 is a diagram for describing processing for determining a second threshold TH2 by a correction to a first function.

The upper row in FIG. 8 shows a function Fa that defines a correlation between the reception level signal obtained in a state in which there is no medium in the transport path 33 and the reception level signal obtained when single sheet feed of the first medium is carried out. A state in which there is no medium in the transport path 33 means that there is no medium between the speaker 51 and the mike 52. In addition, the first medium refers to the thickest medium of the media transportable by the transport unit 30 of the image reading apparatus 10. The reception level signal is a digital value expressed in a predetermined tonal range.

In addition, the bottom row in FIG. 8 shows a first function F1 corresponding to a "first correlation equation" that defines a correlation between the driving voltage and the reception level signal obtained when single sheet feed of the first medium is carried out. The first function F1 defines the reception level signal obtained in accordance with a change in the driving voltage when altitude, temperature, the ultrasonic wave sensor, and the circuits such as the control unit 20 are in an ideal environment or state. The function Fa and the first function F1 are generated in advance and stored in a memory in a state of being readable by the control unit 20.

The control unit 20 determines the second threshold TH2 as follows at the timing when the image reading apparatus 10 is powered on. When the image reading apparatus 10 is powered on, the control unit 20 first causes the voltage regulation circuit 72 to start the supply of the driving voltage V1, and acquires the reception level signal in a state in which there is no medium in the transport path 33. Here, as shown in FIG. 8, it is assumed that when the image reading apparatus 10 is powered on, in accordance with the driving voltage V1, the reception level signal=230 is acquired in a state in which there is no medium in the transport path 33. Note that the specific numerical values shown in FIG. 8 and FIG. 9 to be described later are merely examples, and the disclosure range of the present embodiment is not narrowed by these numerical values.

In accordance with the magnitude of the reception level signal obtained in a situation where there is no medium in the transport path 33 as the image reading apparatus 10 is powered on, the control unit 20 corrects the first function F1. Specifically, the control unit 20 converts the reception level signal=230 acquired in a state in which there is no medium in the transport path 33 with the function Fa, and thereby acquires the reception level signal=200 obtained when single sheet feed of the first medium is carried out. According to the first function F1, when single sheet feed of the first medium is carried out in a situation where the driving voltage V1 is supplied, ideally the reception level signal=300 should be obtained. However, under the situation where the image reading apparatus 10 is currently placed, it was found by calculation that when the driving voltage V1 is supplied and single sheet feed of the first medium is carried out, the reception level signal=200 is obtained. Thus, the control unit 20 corrects the first function F1 with a ratio of the reception level signal=200 obtained by calculation to this ideal reception level signal=300. That is, the first function F1 is multiplied by the ratio to obtain the corrected first function F1'. In FIG. 8, the first function F1' is shown by a two-dot-dash line.

The control unit 20 calculates, from the first function F1', an amount of change Z1 in the reception level signal obtained when the driving voltage is raised from V1 to V2. Thus, under the situation where the image reading apparatus 10 is currently placed, it is understood that when the driving voltage is raised from V1 to V2, in a case in which single sheet feed of the medium is carried out, the reception level signal changes by at least approximately Z1. Accordingly, the control unit 20 may determine that the second threshold TH2=Z1. Alternatively, the control unit 20 may correct Z1 to a somewhat smaller value using a predetermined coefficient and use this corrected value as the second threshold TH2. In this way, the control unit 20 determines the reference amount of change based on the amount of change in the reception level signal corresponding to the rise in the driving voltage from the first voltage to the second voltage obtained by the corrected first correlation equation.

A method of determining the second threshold TH2, which is different from the method described with reference to FIG. 8, will be described with reference to FIG. 9.

Figure 9:
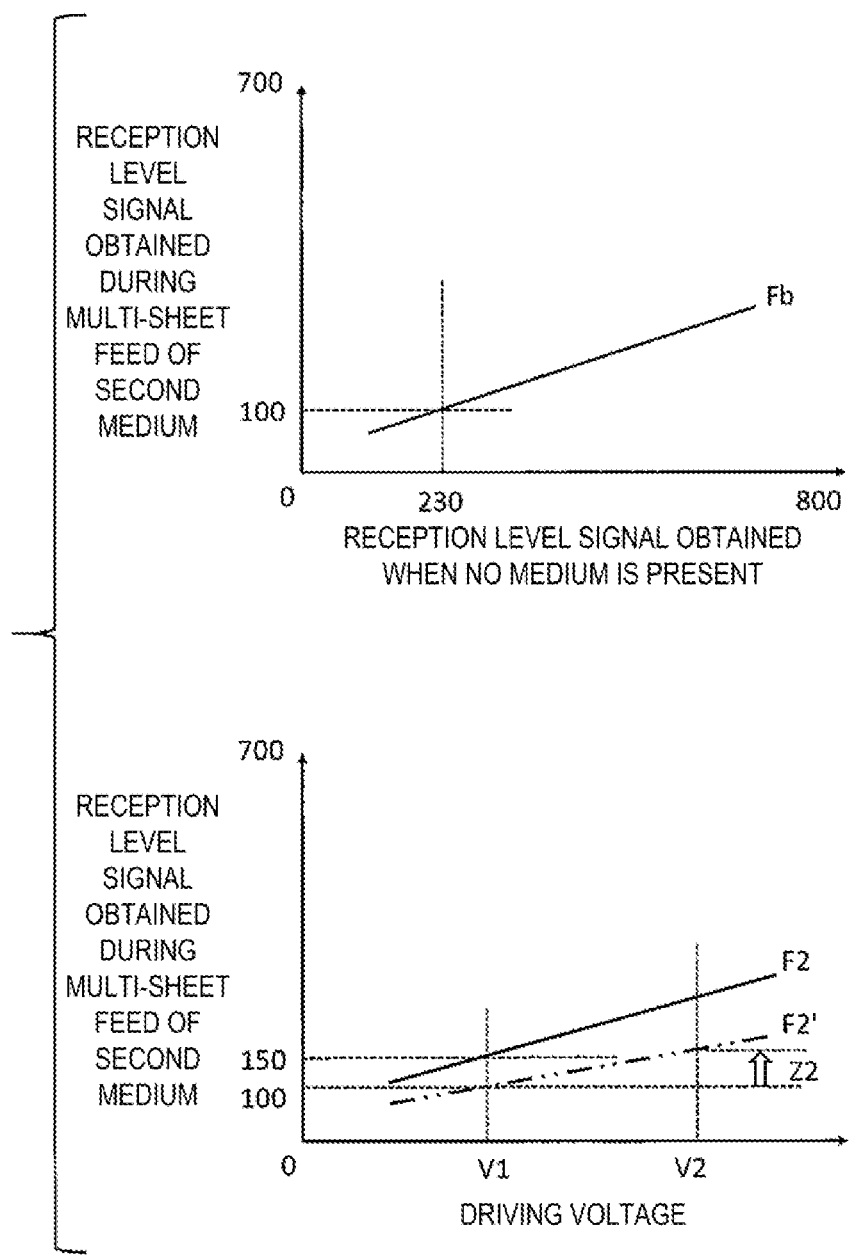
FIG. 9 is a diagram for describing processing for determining a second threshold TH2 by a correction to a second function.

The upper row in FIG. 9 shows a function Fb that defines a correlation between the reception level signal obtained in a state in which there is no medium in the transport path 33 and the reception level signal obtained when multi-sheet feed of the second medium is carried out. The first medium refers to the thinnest medium of the media transportable by the transport unit 30 of the image reading apparatus 10. In addition, the bottom row in FIG. 9 shows a second function F2 corresponding to a "second correlation equation" that defines a correlation between the driving voltage and the reception level signal obtained when multi-sheet feed of the second medium is carried out. The second function F2 defines the reception level signal obtained in accordance with a change in the driving voltage when altitude, temperature, the ultrasonic wave sensor, and the circuits such as the control unit 20 are in an ideal environment or state. The function Fb and the second function F2 are generated in advance and stored in a memory in a state of being readable by the control unit 20.

The control unit 20 determines the second threshold TH2 as follows at the timing when the image reading apparatus 10 is powered on. When the image reading apparatus 10 is powered on, the control unit 20 first causes the voltage regulation circuit 72 to start the supply of the driving voltage V1, and acquires the reception level signal in a state in which there is no medium in the transport path 33. Here, as shown in FIG. 9, it is assumed that when the image reading apparatus 10 is powered on, in accordance with the driving voltage V1, the reception level signal=230 is acquired in a state in which there is no medium in the transport path 33.

In accordance with the magnitude of the reception level signal obtained in a situation where there is no medium in the transport path 33 as the image reading apparatus 10 is powered on, the control unit 20 corrects the second function F2. That is, the control unit 20 converts the reception level signal=230 acquired in a state in which there is no medium in the transport path 33 with the function Fb, and thereby acquires the reception level signal=100 obtained when multi-sheet feed of the second medium is carried out. According to the second function F2, when multi-sheet feed of the second medium is carried out in a situation where the driving voltage V1 is supplied, ideally the reception level signal=150 is obtained. However, under the situation where the image reading apparatus 10 is currently placed, it was found by calculation that when the driving voltage V1 is supplied and multi-sheet feed of the second medium is carried out, the reception level signal=100 is obtained. Thus, the control unit 20 corrects the second function F2 with a ratio obtained by dividing this ideal reception level signal=150 by the reception level signal=100 obtained by calculation. In FIG. 9, the second function F2' obtained by correcting the second function F2 is shown by a two-dot-dash line.

The control unit 20 calculates, from the second function F2', an amount of change Z2 in the reception level signal obtained when the driving voltage is raised from V1 to V2. Thus, under the situation where the image reading apparatus 10 is currently placed, it is understood that when the driving voltage is raised from V1 to V2, in a case in which multi-sheet feed of the medium is carried out, the reception level signal only changes by at most approximately Z2. Accordingly, the control unit 20 may determine that the second threshold TH2=Z2. Alternatively, the control unit 20 may correct Z2 to a somewhat larger value using a predetermined coefficient and use this corrected value as the second threshold TH2. In this way, the control unit 20 may determine the reference amount of change based on the amount of change in the reception level signal corresponding to the rise in the driving voltage from the first voltage to the second voltage obtained by the corrected second correlation equation.

4. Summary

As described above, according to the present embodiment, the image reading apparatus 10 includes: a transport unit 30 configured to transport a medium; a transmission unit and a reception unit disposed at positions sandwiching a transport path 33 of the medium transported by the transport unit 30, the transmission unit being configured to emit an ultrasonic wave in accordance with a driving voltage and the reception unit being configured to receive the ultrasonic wave; a reading unit 40 configured to read the medium transported by the transport unit 30; and a control unit 20 configured to detect occurrence or non-occurrence of multi-sheet feed of the medium based on a reception level signal output by the reception unit in accordance with the received ultrasonic wave.

Furthermore, the control unit 20, after a tip of the medium has reached the positions of the transmission unit and the reception unit in the transport path 33, when the reception level signal is below a predetermined threshold (first threshold TH1), causes the driving voltage to rise from a first voltage to a second voltage, when an amount of change in the reception level signal in accordance with the rise in the driving voltage is smaller than a reference amount of change (second threshold TH2), determines that multi-sheet feed is ongoing, and when the amount of change in the reception level signal in accordance with the rise in the driving voltage is greater than the reference amount of change, determines that multi-sheet feed is not ongoing.

According to the above-described configuration, even when it is determined that the reception level signal is below a predetermined threshold for single sheet feed of the medium due to altitude of the use environment, temperature, product deterioration, or other factors, the control unit 20 determines again whether multi-sheet feed is ongoing in accordance with the amount of change in the reception level signal obtained in accordance with a rise in the driving voltage. Thus, it is possible to suppress single sheet feed from being erroneously determined as multi-sheet feed, and enhance accuracy of multi-sheet feed detection. In addition, suppressing the possibility of erroneous determination reduces the number of cases in which the user has to rescan original documents due to multi-sheet feed determination, and enhances the convenience of the user.

In addition, according to the present embodiment, the control unit 20 may, after changing the driving voltage to the second voltage, repeatedly perform comparison between the amount of change in the reception level signal in accordance with the rise in the driving voltage and the reference amount of change, and when the number of times that the amount of change in the reception level signal in accordance with the rise in the driving voltage is smaller than the reference amount of change exceeds a predetermined number of times (third threshold TH3), determine that multi-sheet feed is ongoing.

According to the above-described configuration, the control unit 20 can further reduce the probability of determining that multi-sheet feed is ongoing even though single sheet feed is ongoing.

In addition, according to the present embodiment, the control unit 20, in accordance with the magnitude of the reception level signal obtained in a situation where no medium is present in the transport path 33 as the image reading apparatus 10 is powered on, corrects a first correlation equation defining a correlation between the driving voltage and the reception level signal obtained when one sheet of a first medium is transported, the first medium being the thickest of media transportable by the transport unit 30 and based on the amount of change in the reception level signal corresponding to the rise in the driving voltage from the first voltage to the second voltage obtained by the corrected first correlation equation, determines the reference amount of change.

Alternatively, the control unit 20 may, in accordance with the magnitude of the reception level signal obtained in a situation where no medium is present in the transport path 33 as the image reading apparatus 10 is powered on, correct a second correlation equation defining a correlation between the driving voltage and the reception level signal obtained when a second medium is transported, the second medium being the thinnest of media transportable by the transport unit 30 and based on the amount of change in the reception level signal corresponding to the rise in the driving voltage from the first voltage to the second voltage obtained by the corrected second correlation equation, determine the reference amount of change.

According to these configurations, the control unit 20 can, based on the current environment and situation of the image reading apparatus 10, determine an appropriate reference amount of change for distinguishing between the amount of change in the reception level signal during single sheet feed and the amount of change in the reception level signal during multi-sheet feed in accordance with a change in the driving voltage.

In addition, according to the present embodiment, after the trailing end of the medium passes through the positions of the transmission unit and the reception unit in the transport path 33, the control unit 20 returns the driving voltage from the second voltage to the first voltage.

According to the above-described configuration, after finishing multi-sheet feed detection processing for a medium, the control unit 20 is capable of smoothly starting multi-sheet feed detection processing for the medium to be transported next.

In addition, according to the present embodiment, the control unit may, after changing the driving voltage to the second voltage, in a case in which the reception level signal is below the reception level signal obtained when the driving voltage is at the first voltage, determine that multi-sheet feed is ongoing.

According to the above-described configuration, when a label is attached in the middle of the medium such that it can be said that partial multi-sheet feed is occurring, the control unit 20 can determine that multi-sheet feed is ongoing.

Note that the second multi-sheet feed determination, which is executed when a "No" determination is made in step S130, need not be as illustrated in FIG. 5. For example, a difference determined to be a negative value in step S340 will be determined to be less than the second threshold TH2 in step S350. Accordingly, in the flowchart in FIG. 5, the control unit 20 may omit the determination of step S340 and execute step S350 after step S330.

In addition, the third threshold TH3, which is compared with the value of the multi-sheet feed count, may be an integer of greater than or equal to 2, but on the other hand may also be 0. That is, since a "No" determination was made in step S130, in a case in which a "No" determination was thereafter made once in step S340 or step S350, the control unit 20 may determine in step S390 that multi-sheet feed is ongoing.

In addition, according to the present embodiment, the control unit 20 may, when determining that multi-sheet feed is ongoing, stop the transport of the medium by the transport unit 30 and perform notification, to the outside, of occurrence of multi-sheet feed.

That is, the control unit 20 performs steps S240 and S250, and steps S410 and S420. For example, in FIG. 5, in a case in which a "No" determination was made in step S340 and the processing proceeded to step S390, the control unit 20 may, at step S420, notify to the user by the notification unit 25 that the reading of the medium may be hindered because a label is attached to the medium.

Apart from the image reading apparatus 10, the present embodiment discloses a multi-sheet feed detection method and a program 24 configured to cause a processor to execute the method.

A multi-sheet feed detection method for detecting, using a transmission unit and a reception unit disposed at positions sandwiching a transport path through which a medium is transported, the transmission unit being configured to emit an ultrasonic wave in accordance with a driving voltage and the reception unit being configured to receive the ultrasonic wave, occurrence or non-occurrence of multi-sheet feed of the medium based on a reception signal level output by the reception unit in accordance with the received ultrasonic wave includes, after a tip of the medium has reached the positions of the transmission unit and the reception unit in the transport path, when the reception level signal is below a predetermined threshold (first threshold TH1), causing the driving voltage to rise from a first voltage to a second voltage; when an amount of change in the reception level signal in accordance with the rise in the driving voltage is smaller than a reference amount of change (second threshold TH2), determining that multi-sheet feed is ongoing; and when the amount of change in the reception level signal in accordance with the rise in the driving voltage is greater than the reference amount of change, determining that multi-sheet feed is not ongoing.

Figure 10A:
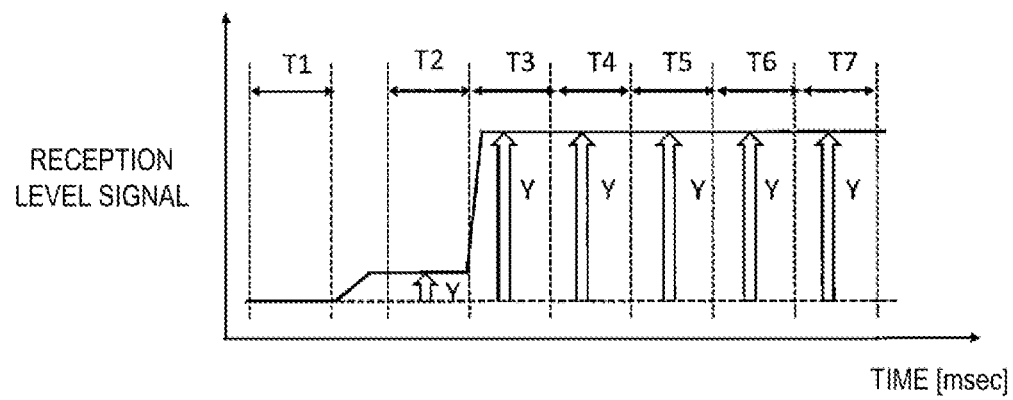
FIG. 10A is a diagram showing change in a reception level signal as a function of time progression assuming single sheet feed of thick paper with a label attached to the tip thereof.
Figure 10B:
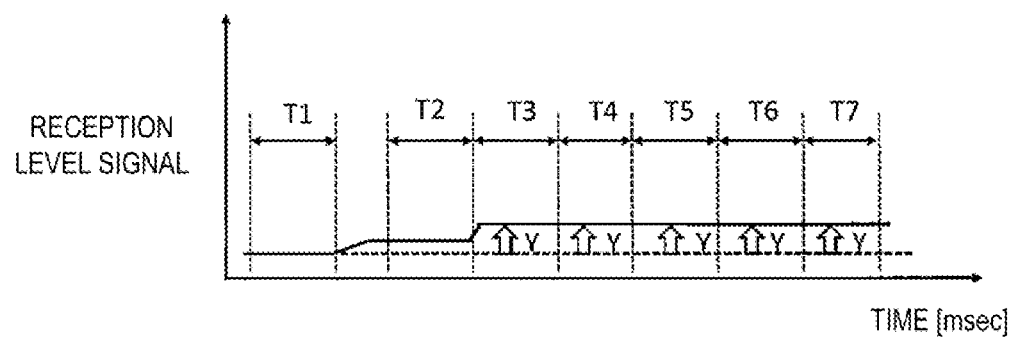
FIG. 10B is a diagram showing change in a reception level signal as a function of time progression assuming a situation where multi-sheet feed of thin paper is ongoing with a label attached to the tip thereof.

With reference to FIGS. 10A and 10B, a specific example of the second multi-sheet feed determination of step S150 will be further described. The way of understanding FIGS. 10A and 10B is the same as that for FIGS. 7A, 7B, and 7C. In FIGS. 10A and 10B as well, similar to FIGS. 7A, 7B, and 7C, the reception level signal for the time period T1 is below the first threshold TH1.

FIG. 10A is a diagram that assumes a situation where single sheet feed of thick paper is carried out with a label attached to the tip thereof. Due to the effect of a label attached to the tip, in the time period T2 after the driving voltage is raised from the first voltage to the second voltage, the difference Y is relatively small and does not exceed the second threshold TH2. However, as a result of the label at the tip having passed through the position of the ultrasonic wave sensor, the reception level signal rises in the time periods T3, T4, T5, T6, T7, . . . , and each difference Y takes a relatively large value. Therefore, in the time periods T3, T4, T5, T6, T7, . . . , each difference Y tends to be above the second threshold TH2, a "Yes" determination tends to be made each time in step S350, and a determination that multi-sheet feed is ongoing tends to be made.

FIG. 10B is a diagram that assumes a situation where multi-sheet feed of thin paper is carried out with a label attached to the tip thereof. Due to the effect of multi-sheet feed and a label attached to the tip, in the time period T2 after the driving voltage is raised from the first voltage to the second voltage, the difference Y is relatively small and does not exceed the second threshold TH2. In addition, even in the time periods T3, T4, T5, T6, T7, . . . , in which the label at the tip has passed through the position of the ultrasonic wave sensor, each difference Y is relatively small due to the effect of multi-sheet feed. Therefore, since each difference Y is below the second threshold TH2, a "No" determination is made each time in step S350, and a correct determination result that multi-sheet feed is ongoing is obtained.

The present embodiment is not limited to an image reading apparatus 10 that reads a medium that serves as an original document, and is applicable to transport apparatuses in general that transport a medium. For example, the features of the present embodiment can also be applied to the configuration of printing apparatuses in which transport of the medium starts from the paper feed tray and the transported medium is printed with ink or toner by the printing unit.

What is claimed is:

1. An image reading apparatus comprising:
a transport unit configured to transport a medium;
a transmission unit and a reception unit disposed at positions sandwiching a transport path of the medium transported by the transport unit, the transmission unit being configured to emit an ultrasonic wave in accordance with a driving voltage and the reception unit being configured to receive the ultrasonic wave;
a reading unit configured to read the medium transported by the transport unit; and
a control unit configured to detect occurrence or non-occurrence of multi-sheet feed of the medium based on a reception level signal output by the reception unit in accordance with the received ultrasonic wave;
the control unit, after a tip of the medium reaches the positions of the transmission unit and the reception unit in the transport path,
when the reception level signal is below a predetermined threshold, causing the driving voltage to rise from a first voltage to a second voltage,
when an amount of change in the reception level signal in accordance with the rise in the driving voltage is smaller than a reference amount of change, determining that multi-sheet feed is ongoing, and
when the amount of change in the reception level signal in accordance with the rise in the driving voltage is greater than the reference amount of change, determining that multi-sheet feed is not ongoing.

2. The image reading apparatus according to claim 1, wherein:
the control unit, after changing the driving voltage to the second voltage, repeatedly performs comparison between the amount of change in the reception level signal in accordance with the rise in the driving voltage and the reference amount of change, and when the number of times that the amount of change in the reception level signal in accordance with the rise in the driving voltage is smaller than the reference amount of change exceeds a predetermined number of times, determines that multi-sheet feed is ongoing.

3. The image reading apparatus according to claim 1, wherein:
the control unit,
in accordance with a magnitude of the reception level signal obtained in a situation where no medium is present in the transport path as the image reading apparatus is powered on, corrects a first correlation equation defining a correlation between the driving voltage and the reception level signal obtained when one sheet of a first medium is transported, the first medium being the thickest of media transportable by the transport unit and
based on the amount of change in the reception level signal corresponding to the rise in the driving voltage from the first voltage to the second voltage obtained by the corrected first correlation equation, determines the reference amount of change.

4. The image reading apparatus according to claim 1, wherein:
the control unit,
in accordance with a magnitude of the reception level signal obtained in a situation where no medium is present in the transport path as the image reading apparatus is powered on, corrects a second correlation equation defining a correlation between the driving voltage and the reception level signal obtained when multi-sheet feed of a second medium is carried out, the second medium being the thinnest of media transportable by the transport unit and
based on the amount of change in the reception level signal corresponding to the rise in the driving voltage from the first voltage to the second voltage obtained by the corrected second correlation equation, determines the reference amount of change.

5. The image reading apparatus according to claim 1, wherein:
the control unit, after a trailing end of the medium passes through the positions of the transmission unit and the reception unit in the transport path, returns the driving voltage from the second voltage to the first voltage.

6. The image reading apparatus according to claim 1, wherein:
the control unit, after changing the driving voltage to the second voltage, in a case in which the reception level signal is below the reception level signal obtained when the driving voltage is at the first voltage, determines that multi-sheet feed is ongoing.

7. The image reading apparatus according to claim 1, wherein:
the control unit, when determining that multi-sheet feed is ongoing, stops transport of the medium by the transport unit and performs notification, to the outside, of occurrence of multi-sheet feed.

8. A multi-sheet feed detection method for detecting, using a transmission unit configured to emit an ultrasonic wave in accordance with a driving voltage and a reception unit configured to receive the ultrasonic wave that are disposed at positions sandwiching a transport path through which a medium is transported, occurrence or non-occurrence of multi-sheet feed of the medium based on a reception signal level output by the reception unit in accordance with the received ultrasonic wave, the method comprising:
after a tip of the medium reaches the positions of the transmission unit and the reception unit in the transport path, when the reception level signal is below a predetermined threshold, causing the driving voltage to rise from a first voltage to a second voltage;
when an amount of change in the reception level signal in accordance with the rise in the driving voltage is smaller than a reference amount of change, determining that multi-sheet feed is ongoing; and
when the amount of change in the reception level signal in accordance with the rise in the driving voltage is greater than the reference amount of change, determining that multi-sheet feed is not ongoing.

* * * * *